US010279515B2

(12) United States Patent
Holeschovsky et al.

(10) Patent No.: US 10,279,515 B2
(45) Date of Patent: May 7, 2019

(54) PROCESSES FOR PRODUCING FLEXIBLE POLYURETHANE FOAM LAMINATES AND LAMINATES PRODUCED THEREBY

(71) Applicant: Covestro LLC, Pittsburgh, PA (US)

(72) Inventors: Ulrich B. Holeschovsky, Pittsburgh, PA (US); Robert F. Felt, Wexford, PA (US); Michael S. Robinson, Rocky Face, GA (US); Susan C. Pigott, Clinton, PA (US)

(73) Assignee: COVESTRO LLC, Pittsburgh, PA (US)

( * ) Notice: Subject to any disclaimer, the term of this patent is extended or adjusted under 35 U.S.C. 154(b) by 444 days.

(21) Appl. No.: 15/046,930

(22) Filed: Feb. 18, 2016

(65) Prior Publication Data

US 2017/0239857 A1    Aug. 24, 2017

(51) Int. Cl.

| | | |
|---|---|---|
| *B29C 44/30* | (2006.01) | |
| *B29C 44/32* | (2006.01) | |
| *C08G 18/48* | (2006.01) | |
| *C08G 18/66* | (2006.01) | |
| *C08G 18/76* | (2006.01) | |
| *C08G 18/16* | (2006.01) | |
| *C08G 18/32* | (2006.01) | |
| *B29L 31/00* | (2006.01) | |
| *D06N 7/00* | (2006.01) | |
| *B29K 75/00* | (2006.01) | |
| *B29C 44/34* | (2006.01) | |

(Continued)

(52) U.S. Cl.
CPC .......... *B29C 44/302* (2013.01); *B29C 44/326* (2013.01); *C08G 18/165* (2013.01); *C08G 18/3206* (2013.01); *C08G 18/4812* (2013.01); *C08G 18/4825* (2013.01); *C08G 18/4841* (2013.01); *C08G 18/6674* (2013.01); *C08G 18/7664* (2013.01); *B29C 44/3415* (2013.01); *B29K 2075/00* (2013.01); *B29K 2995/0063* (2013.01); *B29L 2009/00* (2013.01); *B29L 2031/7322* (2013.01); *C08G 18/48* (2013.01); *C08G 2101/0008* (2013.01); *C08G 2101/0083* (2013.01); *D06N 7/0086* (2013.01)

(58) Field of Classification Search
CPC ... B29C 44/302; B29C 44/326; B29C 44/328; B29C 44/321; B29K 2075/00; B32B 2266/0278; B32B 2375/00; B32B 2038/0084; B32B 5/20; B29L 2009/00; B29L 2007/00
See application file for complete search history.

(56) References Cited

U.S. PATENT DOCUMENTS

| 2,784,565 A | 9/1956 | Peter et al. |
|---|---|---|
| 3,429,056 A | 2/1959 | Porter |

(Continued)

FOREIGN PATENT DOCUMENTS

| EP | 0116309 A1 | 8/1984 |
|---|---|---|
| EP | 0443129 A2 | 8/1991 |

(Continued)

*Primary Examiner* — Joseph S Del Sole
*Assistant Examiner* — Jerzi H Moreno Hernandez
(74) *Attorney, Agent, or Firm* — Donald R. Palladino (57) ABSTRACT

Disclosed are continuous compression molding processes for producing a flexible polyurethane foam laminate and laminates produced thereby, which may be suitable for use, for example, as a carpet underlayment.

22 Claims, 1 Drawing Sheet (51) Int. Cl.
*B29L 9/00* (2006.01)
*C08G 101/00* (2006.01)

(56) References Cited

U.S. PATENT DOCUMENTS

| | | | |
|---|---|---|---|
| 2,898,626 A | 8/1959 | Alderfer et al. | |
| 3,215,652 A | 11/1965 | Kaplan | |
| 3,620,863 A * | 11/1971 | Sullhofer | B29C 44/30 264/46.2 |
| 3,686,047 A | 8/1972 | Miller | |
| 3,702,274 A * | 11/1972 | Wooler | B29C 44/304 156/79 |
| 3,887,500 A | 6/1975 | Prokai | |
| 3,933,548 A | 1/1976 | Anderson, Jr. et al. | |
| 3,957,842 A | 5/1976 | Prokai | |
| 4,043,719 A * | 8/1977 | Jones | B29C 44/30 264/46.2 |
| 4,216,177 A * | 8/1980 | Otto | B29C 44/326 264/415 |
| 4,781,774 A * | 11/1988 | Steward | B29C 44/22 156/221 |
| 4,863,791 A | 9/1989 | Steward et al. | |
| 5,158,922 A | 10/1992 | Hinney | |
| 5,470,813 A | 11/1995 | Le-khac | |
| 5,531,849 A | 7/1996 | Collins et al. | |
| 5,798,064 A | 8/1998 | Peterson | |
| 6,623,676 B1 * | 9/2003 | Davis | B29B 17/0042 264/112 |
| 7,138,077 B2 | 11/2006 | Ehbing et al. | |
| 7,268,170 B2 | 9/2007 | Anderson et al. | |
| 7,279,068 B2 | 10/2007 | Morgan | |
| 9,133,298 B2 | 9/2015 | Hager et al. | |
| 2006/0235098 A1 * | 10/2006 | Burdeniuc | C08G 18/1825 521/99 |
| 2008/0096994 A1 * | 4/2008 | Snider | C08J 9/146 521/98 |
| 2008/0242822 A1 * | 10/2008 | West | C08G 18/6446 527/204 |
| 2013/0310474 A1 * | 1/2013 | Scussolin | C08G 18/12 521/114 |
| 2015/0080276 A1 * | 3/2015 | Hansel | C08G 18/14 507/238 |
| 2015/0375489 A1 * | 12/2015 | Rees | B32B 37/10 156/78 |

FOREIGN PATENT DOCUMENTS

| | | | |
|---|---|---|---|
| GB | 1098471 A * | 1/1968 | B29C 44/30 |
| WO | 00/17248 | 3/2000 | |

* cited by examiner

PROCESSES FOR PRODUCING FLEXIBLE POLYURETHANE FOAM LAMINATES AND LAMINATES PRODUCED THEREBY

FIELD

The present invention is directed to, among other things, continuous compression molding processes for producing a flexible polyurethane foam laminate and laminates produced thereby, which may be suitable for use, for example, as a carpet underlayment.

BACKGROUND

Polymeric foam pads are typically used as a carpet underlayment to act as a cushion that improves the resiliency and comfort of the carpet. Historically, these foam pads have been made of low cost polyurethane foam "rebond" that is produced by bonding recycled foam scraps using isocyanate as binder to bond the foam pieces together. While being of low cost, polyurethane "rebond" has its disadvantages. For example, the thickness of "rebond" typically varies considerably, which results in inconsistent performance. In addition, because it is made of recycled foam materials, it can contain foam that has been exposed to people or animals or it can contain other contaminants, such as rubber crumb, which can be environmentally undesirable.

As a result, efforts have been made to produce polyurethane foam carpet underlayments using virgin materials. In some cases, these sheets are made by a polyurethane froth process in which the polyisocyanate and isocyanate-reactive ingredients are combined in a special mixer and allowed to froth to form a foam which is then formed into a sheet. This process has typically been used, however, only to produce higher density foams (usually from 10 to 20 lb/ft$^3$ as compared to typical foam densities of 5 to 10 lb/ft$^3$ for rebond) and is only used for producing carpet underlayments for use in specialty, high traffic area, applications, at least in part due to higher material costs due to the higher density.

Efforts have also been made to produce polyurethane foam carpet underlayments using virgin materials by a continuous process using a conveyor system in which the polyurethane foam is formed between two facing materials to form a sandwich structure. Examples of such processes are described in U.S. Pat. Nos. 5,531,849 and 5,798,064. A disadvantage of the processes developed to date, however, is that they have not been efficient enough to produce polyurethane foam carpet underlayments using virgin materials that are cost competitive with "rebond".

As a result, it would be desirable to provide a continuous process to produce polyurethane foam carpet underlayments using virgin materials that is sufficiently efficient to be cost competitive with rebond, while providing a product with significantly more consistent thickness (gauge) control relative to rebond. Moreover, it would be desirable to provide such a process that does not require the use of an oven, and the capital and operating costs associated therewith, to cure the polyurethane to produce such an underlayment.

The present invention was made in view of the foregoing desire.

SUMMARY OF THE INVENTION

In certain respects, the present invention is directed to continuous compression molding processes for producing a flexible polyurethane foam laminate. These processes comprise: (a) feeding a first facing material along a first heated surface; (b) feeding a second facing material along a second heated surface, wherein the second heated surface is disposed generally parallel to the first heated surface at a preselected distance that defines a vertical space between the first facing material and the second facing material and that defines the thickness of the laminate; (c) depositing a polyurethane foam-forming composition onto the first facing material as it is being fed; and (d) allowing the polyurethane foam-forming composition to react in the vertical space, thereby rising until the rise is restricted by the second facing material and wherein the polyurethane foam-forming composition produces a cured flexible polyurethane foam laminate having a foam density of no more than 10 lb/ft$^3$ (160 kg/m$^3$).

The present invention is also directed to, among other things, laminates produced by such processes and carpet underlayments comprising such laminates.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, in certain embodiments, the present invention is directed to continuous compression molding processes for producing a flexible polyurethane foam laminate. As will be appreciated, polyurethane foams have traditionally been categorized as being flexible, semi-rigid or rigid: with flexible foams generally being softer, less dense, more pliable and more subject to structural rebound subsequent to loading than are rigid foams. As such, the term "flexible foam", as used herein, refers to foams that have a ratio of tensile strength to compressive strength (25% deflection) of at least 15:1, such as 15 to 70:1, or, in some cases 15 to 60:1, as set forth in "Polyurethanes: Chemistry and Technology, Part II Technology," J. H. Saunders & K. C. Frisch, Interscience Publishers, 1964, page 117. In addition, in certain embodiments of the present invention, the flexible foam also has a % elongation of at least 100%, such as at least 130%, at least 150%, or, in some cases at least 200%. Moreover, in certain embodiments, the flexible foams produced according to the methods of the present invention have a CFD 65% compression force deflection ranging from 1.5 to 10 psi, such as 1.5 to 8 psi, or, in some cases, 1.5 to 6 psi. All of the foregoing property testing of flexible foams for purposes of the present invention is done in accordance with ASTM D3574-11. By contrast, as will be appreciated, a rigid foam is characterized as having a ratio of compressive strength to tensile strength of at least 0.5:1, elongation of less than 10%, as well as a low recovery rate from distortion and a low elastic limit, as described in "Polyurethanes: Chemistry and Technology, Part II Technology," J. H. Saunders & K. C. Frisch, Interscience Publishers, 1964, page 239.

Figure 1:
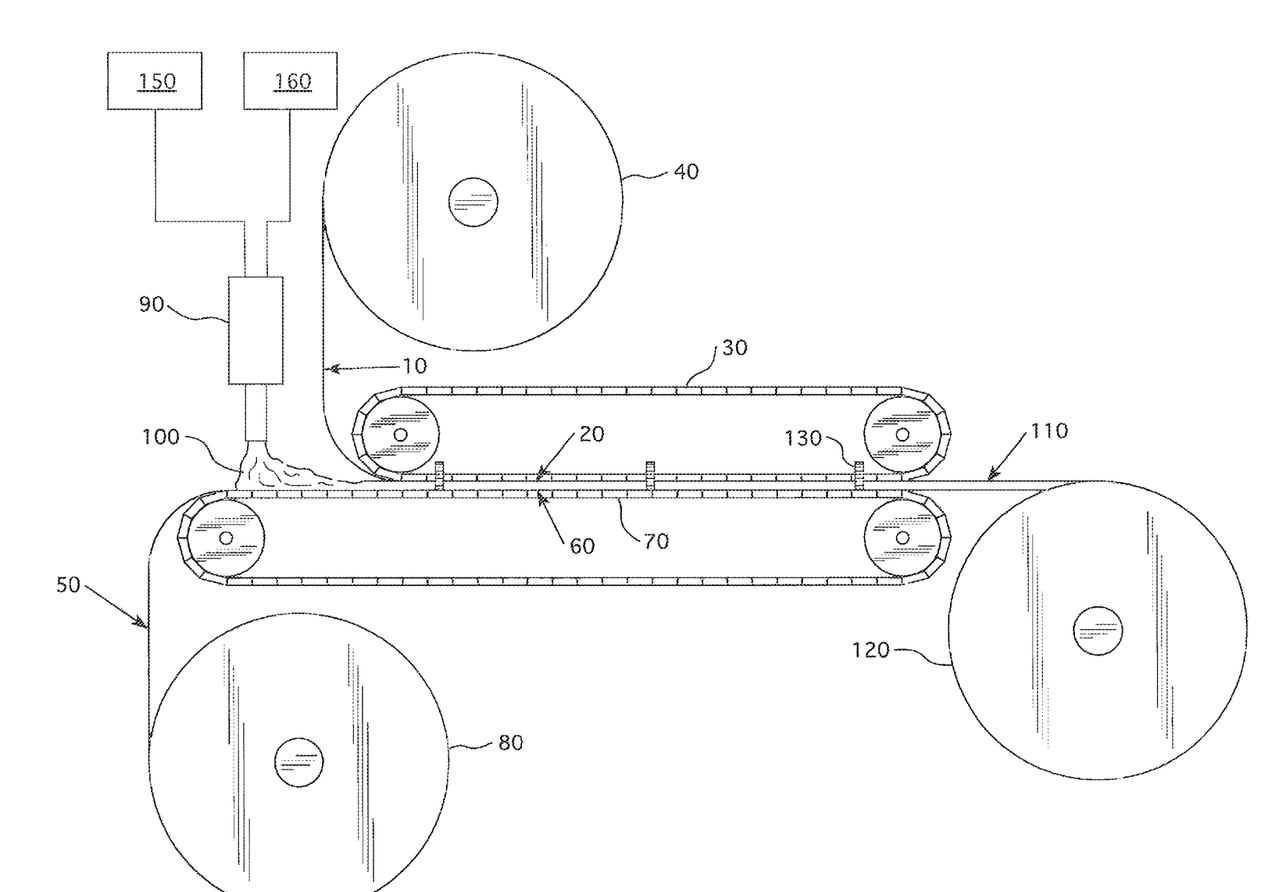
FIG. 1 is an illustration of a process of certain embodiments of the present invention.

As indicated, the processes of the present invention comprise feeding a first facing material along a first heated surface. In certain embodiments of the present invention, the first heated surface comprises one or more, in some cases, a plurality of, first heated metal platens. The first heated surface, such as the one or more first heated metal platens, can be moving or stationary. For example, as illustrated in FIG. 1, in certain embodiments, processes of the present invention comprise feeding a first facing material 50 along a surface of a first conveyor path 60 comprising one or more, such as a first plurality of, heated metal platens 70. Suitable first facing materials include, for example, water impermeable flexible films, such as polymeric films comprising polypropylene, polyethylene, polyester, and/or polyvinyls, as well as flexible aluminum films. In addition, in the processes of the present invention, a second facing material is fed along a second heated surface. In certain embodiments, the second heated surface comprises one or more, in some cases, a plurality of, second heated metal platens. The second heated surface, such as the one or more second heated metal platens, can be moving or stationary. For example, as also illustrated in FIG. 1, in certain embodiments, a second facing material 10 is fed along a surface of a second conveyor path 20 comprising a second plurality of heated metal platens 30. The second facing material may be the same as or different from the first facing material. As is apparent, in certain embodiments, the first facing material 50 and/or the second facing material 10 is supplied from supply roles 40 and 80, respectively. In certain embodiments, one or both of the first facing material 50 and the second facing material 10 is removable from the resulting laminate.

As is further apparent, in the present invention, the second heated surface, such as the second plurality of heated metal platens 30 of the second conveyor path 20, are disposed generally parallel to the first heated surface, such as the first plurality heated metal platens 70 of the first conveyor path 60, at a preselected distance that defines a vertical space between the first facing material 50 and the second facing material 10 and that defines the thickness of the laminate 110. As is apparent, in certain embodiments, the distance may be adjusted by one or more gap adjustment means 130, such as one or more hydraulic cylinders, pneumatic cylinders, and/or screws. As used herein, "generally parallel" means that the variation in the vertical space between the second heated surface to the first heated surface is less than 10% of the space thickness, such as less than 5% or less than 1% of the space thickness. In certain embodiments of the processes of the present invention, the preselected distance is from ¼ to 1 inch, such as ¼ to ¾ inch, or, in some cases, ½ inch. In certain embodiments of the present invention, the preselected distance is at least twice the desired thickness of the end product, such as a carpet underlayment.

In the processes of the present invention, a mixture of polyurethane foam-forming components is deposited onto the first facing material 50 as it is being fed. As will be appreciated, the polyurethane foam is formed by reaction of an isocyanate-reactive composition with a polyisocyanate. As a result, in certain embodiments of the processes of the present invention, an isocyanate-reactive composition is supplied to mix head 90 from an isocyanate-reactive composition-containing storage vessel 150 and a polyisocyanate is supplied to mix head 90 from a polyisocyanate storage vessel 160.

In certain embodiments of the present invention, the isocyanate-reactive composition comprises a polyol or, in some cases, a blend of two or more polyols. For example, in certain embodiments of the present invention, the isocyanate-reactive composition comprises: (a) a polyether polyol having a nominal functionality of at least 3 and an average OH number of 20 to 100; (b) a polyether diol having a number average molecular weight of at least 1000 grams/mole, and (c) a chain extender having a hydroxyl functional of 2 and a molecular weight of no more than 300 grams/mole.

Suitable polyether polyols (a) having a nominal functionality of at least 3 include those having a nominal functionality of, for example, 3 to 8, 3 to 6, or, in some cases 3 to 4, or, in yet other cases, 3 (a triol). As used herein, "nominal functionality" means the average number of active hydrogen groups on the initiator or initiator blend used in producing the polyol. In certain embodiments, the average OH (hydroxyl) number of such polyether polyols is at least 20, such as at least 25, or, in some cases, at least 30. In certain embodiments, the average OH number of such polyether polyols is no more than 100, such as no more than 80, or, in some cases, no more than 75. As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH\# = (56100/eq.wt.) = (56100) \times (f/mol.wt.)$$

wherein: OH: represents the hydroxyl number of the polyol, eq. wt.: weight per molar equivalents of contained OH groups, f: represents the nominal functionality of the polyol, i.e. the average number of active hydrogen groups on the initiator or initiator blend used in producing the polyol, and mol. wt.: represents the nominal number average molecular weight based on the measured hydroxyl number and the nominal functionality of the polyol.

In certain embodiments, the foregoing polyether polyol is the reaction product of one or more suitable initiators and one or more alkylene oxides.

Suitable initiators include dihydric initiators such as ethylene glycol, diethylene glycol, triethylene glycol, propylene glycol, dipropylene glycol, tripropylene glycol, neopentyl glycol, 1,3-propanediol, 1,4-butanediol, 1,6-hexanediol, 1,4-cyclo-hexanediol, 1,4-cyclohexane-dimethanol, hydroquinone, hydroquinone bis(2-hydroxyethyl)ether, the various bisphenols, such as bisphenol A and bisphenol F and their bis(hydroxyalkyl) ether derivatives, aniline, the various N—N-bis(hydroxyalkyl)anilines, primary alkyl amines and the various N—N-bis(hydroxyalkyl)amines; trihydric initiators such as glycerine, trimethylolpropane, trimethylolethane, the various alkanolamines such as ethanolamine, diethanolamine, triethanolamine, propanolamine, dipropanolamine, and tripropanolamine; tetrahydric initiators such as pentaerythritol, ethylene diamine, N,N,N',N'-tetrakis[2-hydroxyalkyl]ethylenediamines, toulene diamine and N,N,N',N'-tetrakis[hydroxyalkyl]toluene diamines: pentahydric initiators such as the various alkylglucosides, particularly α-methylglucoside; hexahydric initators such as sorbitol, mannitol, hydroxyethylglucoside, and hydroxypropyl glucoside; octahydric initiators such as sucrose; and higher functionality initiators such as various starch and partially hydrolyzed starch-based products, and methylol group-containing resins and novolak resins such as those prepared from the reaction of as aldehyde, preferably formaldehyde, with a phenol, cresol, or other aromatic hydroxyl-containing compound.

Such initiators are typically copolymerized with one or more alkylene oxides to form the polyether polyol. Examples of such alkylene oxides include ethylene oxide, propylene oxide, butylene oxide, styrene oxide and mixtures thereof. Mixtures of these alkylene oxides can be added simultaneously or sequentially to provide internal blocks, terminal blocks or random distribution of the alkylene oxide groups in the polyether polyol. In certain embodiments, the mixture comprises ethylene oxide and propylene oxide, wherein the total amount of copolymerized oxyethylene in the resultant polyether polyol is less than 30%, in some cases no more than 25%, by weight, based on the total weight of oxyalkylene used.

A common process for polymerizing such polyols is the base catalyzed addition of the oxide monomers to the active hydrogen groups of the polyhydric initiator(s) and subsequently to the oligomeric polyol moieties. Potassium hydroxide or sodium hydroxide are common basic catalysts that are used. Polyols produced by this process can contain significant quantities of unsaturated monols resulting from the isomerization of oxypropylene monomer to allyl alcohol under the conditions of the reaction. This monofunctional alcohol can then function as an active hydrogen site for further oxide addition.

Alternatively, polyethers polyols that are low unsaturation (low monol) poly(oxypropylene/oxyethylene) polyols manufactured with a double metal cyanide catalyst can be used. These poly(oxypropylene/oxyethylene) low unsaturation polyols are prepared by oxyalkylating a suitably hydric initiator compound with propylene oxide and ethylene oxide in the presence of a double metal cyanide catalyst, such as the double metal cyanide complex catalysts disclosed in U.S. Pat. Nos. 5,158,922 and 5,470,813, the disclosures of which being incorporated herein by reference. The amount of ethylene oxide in the ethylene oxide/propylene oxide mixture may be increased during the latter stages of the polymerization to increase the primary hydroxyl content of the polyol. Alternatively, the low unsaturation polyol may be capped with ethylene oxide using non-DMC catalysts.

When the oxyalkylation is performed in the presence of double metal cyanide catalysts, it is sometimes desirable that initiator molecules containing strongly basic groups, such as primary and secondary amines, be avoided. Further, when employing double metal cyanide complex catalysts, it is sometimes desirable to oxyalkylate an oligomer which comprises a previously oxyalkylated "monomeric" initiator molecule. The polyoxyalkylene oligomeric initiators may be prepared by oxyalkylating a "monomeric" initiator in the presence of traditional basic catalysts such as sodium or potassium hydroxide or other non-DMC catalysts. It may be necessary to neutralize and/or remove these basic catalysts prior to addition and initiation of the DMC catalyst.

In certain embodiments, the polyether polyol (a) described above is present in the isocyanate-reactive composition in an amount of at least 50% by weight, such as at least 60% by weight, or, in some cases, at least 70% by weight and/or up to 90% by weight, based on the total weight of isocyanate-reactive components in the isocyanate-reactive composition.

As indicated, in certain embodiments of the present invention, the isocyanate-reactive composition further comprises one or more polyether diols, such as polyethylene glycols, polypropylene glycols and mixtures thereof. In certain embodiments, the polyether diol has a number average molecular weight of at least 1000 grams/mole and/or up to 4000 grams/mole, such as, for example, from 1500 to 2500 grams/mole.

In certain embodiments, the polyether diol is present in the isocyanate-reactive composition in an amount of at least 5% by weight, such as at least 10% by weight and/or up to 20% by weight, based on the total weight of isocyanate-reactive components in the isocyanate-reactive composition.

As also indicated above, in certain embodiments of the present invention, the polyol-containing component also comprises one or more chain extenders, such as those having a hydroxyl functionality of approximately 2 and a molecular weight of no greater than 300 grams/mole. Specific examples of suitable chain extenders include, but are not limited to, ethylene glycol; 1,2- and 1,3-propanediol; 1,4-butanediol; 1,6-hexanediol; diethylene glycol; dipropylene glycol; neopentyl glycol; and 2-methyl-1,3-propanediol.

In certain embodiments, the chain extender is present in the isocyanate-reactive composition in an amount of at least 1% by weight, such as at least 2% by weight and/or up to 10% by weight, such as up to 6% by weight, based on the total weight of isocyanate-reactive components in the isocyanate-reactive composition.

The isocyanate-reactive composition, in some embodiments of the present invention, also comprises other ingredients, including, but not necessarily limited to, a blowing agent, a catalyst, and a surfactant.

Suitable blowing agents for use in the isocyanate-reactive composition include, for example, halogenated hydrocarbons, water, liquid carbon dioxide, low boiling solvents such as, for example, pentane, among others. In certain embodiments, water is used as the sole blowing agent, whereas, in some other embodiments, water is used in conjunction with other blowing agents such as, for example, pentane, acetone, cyclopentane, cyclohexane, partially or completely fluorinated hydrocarbons, methylene chloride and liquid carbon dioxide. In some embodiments of the present invention, the blowing agent, such as water, is used in an amount of at least 0.3% by weight, such as at least 0.5% by weight, or, in some cases, at least 1% by weight and/or up to 10% by weight, up to 5% by weight, or, in some cases, up to 3% by weight, based on the total weight of the isocyanate-reactive composition.

Suitable catalysts for use in the isocyanate-reactive composition include, for example, the various polyurethane catalysts which are known to be capable of promoting the reaction between the polyisocyanate component and the isocyanate-reactive components, including water. Examples of such catalysts include, but are not limited to, tertiary amines and metal compounds. Some examples of suitable tertiary amine catalysts include triethylamine, tributylamine, N-methylmorpholine, N-ethyl-morpholine, N,N,N',N'-tetramethylethylene diamine, pentamethyl-diethylene triamine, and higher homologs, 1,4-diazabicyclo[2.2.2]octane, N-methyl-N'-(dimethylaminoethyl) piperazine, bis(dimethylaminoalkyl)-piperazines, N,N-dimethylbenzylamine, N,N-dimethylcyclohexylamine, N,N-diethylbenzylamine, bis(N,N-diethyl-aminoethyl) adipate, N,N,N',N'-tetramethyl-1,3-butanediamine, N,N-dimethyl-β-phenylethylamine, 1,2-dimethylimidazole, 2-methylimidazole, monocyclic and bicyclic amidines, bis(dialkylamino)alkyl ethers, and tertiary amines containing amide groups (such as formamide groups). The catalysts used may also be the known Mannich bases of secondary amines (such as dimethylamine) and aldehydes (such as formaldehyde) or ketones (such as acetone) and phenols.

In certain embodiments of the present invention, the catalyst composition comprises a mixture of "non-emissive amine catalysts" having isocyanate reactive functionalities that react into the polyurethane matrix, thereby not contributing to emissions. Examples of such catalysts include triethanolamine, triisopropanoamine, N-methyldiethanolamine. N-ethyl-diethanolamine, N,N-dimethylethanolamine, their reaction products with alkylene oxides (such as propylene oxide and/or ethylene oxide) and secondary-tertiary amines. One specific example of such a "non-emissive amine catalyst" is N,N,N'-trimethyl-N'-3-aminopropyl-bis(aminoethyl)ether, commercially available as Dabco® NE 300, from Air Products and Chemicals Inc.

Other suitable catalysts include organic metal compounds, such as organic tin, bismuth, and zinc compounds. Suitable organic tin compounds include those containing sulfur, such as dioctyl tin mercaptide, and, in some cases, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutyltin maleate, and dioctyltin diacetate. Suitable bismuth compounds include bismuth neodecanoate, bismuth versalate, and various bismuth carboxylates known in the art. Suitable zinc compounds include zinc neodecanoate and zinc versalate. Mixed metal salts containing more than one metal (such as carboxylic acid salts containing both zinc and bismuth) are also suitable catalysts.

The quantity of catalyst varies widely depending on the specific catalyst used. In the processes of the present invention, the type of catalyst and the level of catalyst used is selected so that the foam-forming composition cures under the line speeds and heated surface temperatures selected, even without the use of a cure oven. In certain embodiments, the catalyst composition comprises a mixture of at least one non-emissive amine catalyst and at least one tin catalyst.

Suitable surfactants for use in the isocyanate-reactive composition include silicone surfactants such as, for example, polysiloxanes and siloxane/poly(alkylene oxide) copolymers of various structures and molecular weights. The structure of these compounds is generally such that a copolymer of ethylene oxide and propylene oxide is attached to a polydimethyl siloxane radical. Such surfactants are known and described in, for example, U.S. Pat. Nos. 2,764, 565, 3,887,500 and 3,957,842, the disclosures of which are hereby incorporated by reference. It is sometimes desirable to use surfactants in amounts of from 0.05 to 5% by weight, such as 0.2 to 3% by weight, based on the total weight of the isocyanate-reactive composition.

Examples of suitable commercially available surfactants include the silicone surfactants B-4690, B-4113 and B-8250, B-2370, B-8707, B-8228, B-8002 and their low fogging (LF) versions, which are available from DeGussa/Goldschmidt and the silicone surfactants Niax U-2000, L-620, L-636, L-5614, L-5639, L-626, and L-627, which are commercially available from Momentive and the silicone surfactants Dabco DC5164, DC5169, and DC5043 which are available from Air Products.

In addition, other additives which may be used include, for example, release agents, pigments, cell regulators, flame retarding agents, plasticizers, dyes, antistatic agents, antimicrobials, cross-linking agents, antioxidants, UV stabilizers, mineral oils, fillers and reinforcing agents such as glass in the form of fibers or flakes or carbon fibers.

Any of the known organic isocyanates, modified isocyanates or isocyanate-terminated prepolymers made from any of the known organic isocyanates may be used in the foam-forming composition. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used in the foam-forming composition. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates obtained by chemical reaction of diisocyanates and/or polyisocyanates can be used. Modified isocyanates useful in the practice of the present invention include isocyanates containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

In some embodiments of the foam-forming composition, the polyisocyanate includes a methylene-bridged polyphenyl polyisocyanate and/or a prepolymer of methylene-bridged polyphenyl polyisocyanates having an average functionality of from 1.8 to 3.5, such as from 2.0 to 3.1, or 2.4 to 2.6, isocyanate moieties per molecule and an NCO content of from 25 to 35 weight percent, such as 30 to 34 weight percent, due to their ability to cross-link the polyurethane.

In certain embodiments of the processes of the present invention, the isocyanate-reactive composition and polyisocyanate are supplied to mix head 90 in relative amounts such that the equivalent ratio of isocyanate groups to isocyanate-reactive groups is from 0.8 to 1.6, such as from 0.8 to 1.2, or from 0.9 to 1.1.

Referring again to FIG. 1, according to the processes of the present invention, after the polyurethane foam-forming composition is deposited onto the first facing material 50 as it is being fed, the polyurethane foam-forming composition reacts in the vertical space defined between the first facing material 50 and the second facing material 10, thereby rising until the rise is restricted by the second facing material 10, which defines the thickness of the resulting foam laminate 110. In certain embodiments of the processes of the present invention, the thickness is ¼ to 1 inch, such as ¼ to ¾ inch, or, in some cases, ½ inch.

While the polyurethane foam-forming composition is conveyed between first heated surface, such as the plurality of heated metal platens 70, and the second heated surface, such as the second plurality heated metal platens 30, the vertical expansion of the composition is restricted while the horizontal expansion of the mixture is restricted in the direction the composition is being conveyed by the reacted foam ahead, and in the opposite direction by the continuous flow of new reacting foam-forming composition behind it. Accordingly, the expanding mixture can flow laterally, perpendicular to the direction of the conveyor paths 20 and 60, where it can expand. In certain embodiments, the polyurethane foam-forming composition is conveyed between first heated surface, such as the first plurality of heated metal platens 70, and the second heated surface, such as the second plurality of heated platens 30, at a speed of at least 50 feet/minute (15 meters/minute), such as at least 80 feet/minute (24 meters/minute), such as 50 to 200 feet/minute (15 to 61 meters/minute), or, in some cases 80 to 120 feet/minute (24 to 37 meters/minute).

By allowing the foam-forming composition to expand laterally, the process of the present invention provides a means of forming a flexible foam that is substantially uniform in height and width and that has foam cells that are substantially uniform in size and shape.

According to the processes of the present invention, a cured flexible polyurethane foam laminate having a foam density of no more than 10 lb/ft$^3$ (160 kg/m$^3$), in some cases no more than 8 lb/ft$^3$ (128 kg/m$^3$), no more than 6 lb/ft$^3$ (96 kg/m$^3$), no more than 5 lb/ft$^3$ (80 kg/m$^3$), or, in some cases, 2 to 4 lb/ft$^3$ (32 to 64 kg/m$^3$) is produced. In certain embodiments, the foam-forming composition is essentially cured to produce a cured flexible polyurethane foam laminate before the composition passes the first heated surface and the second heated surface such that no oven is necessary for curing. In some embodiments of the present invention, the cured flexible polyurethane foam laminate passes through an accumulator (not shown in FIG. 1) in order to provide additional residence time at ambient temperature (such as no more than 75° F.) to allow the laminate to cool down prior to it being rolled up. In fact, it was surprisingly discovered that, by proper selection of process conditions (such as line speed, dwell time, foam thickness and surface temperature and dimensions of the heated platens) and proper selection of the components selected for the polyurethane foam-forming composition, it was possible to produce such a cured flexible polyurethane foam laminate having a foam density of 2 to 4 lb/ft$^3$ (32 to 64 kg/m$^3$) before the composition passes the first heated surface and the second heated surface, even without the use of a curing oven. In certain embodiments, the dwell time (i.e., the time during which the foam-forming composition is between the first heated surface, such as the first plurality of heated metal platens 70 of the first conveyor path 60, and the second heated surface, such as the second plurality of heated metal platens 30 of the second conveyor path 20) is about 30 seconds to 2 minutes, such as about 1 minute.

In certain embodiments, for example, the first heated surface, such as the first plurality of heated metal platens 70, and/or the second heated surface, such as the second plurality of heated metal platens 30, have a width corresponding to the width of the polyurethane foam laminate 110. As used herein, the term "heated surface" means that the surface, such as a heated metal platen, has a surface temperature greater than ambient temperature (72° F.). More particularly, in certain embodiments of the present invention, the first heated surface, such as the one or more first heated metal platens 70 and/or the second heated surface, such as the one or more second heated metal platens 30 have a surface temperature of at least 100° F. (38° C.), such as at least 120° F. (49° C.), at least 140° F. (60° C.), in some cases, 100 to 200° F. (38 to 93° C.), 120 to 180° F. (49 to 82° C.), or 140 to 160° F. (60 to 71° C.). In certain embodiments, the one or more first heated metal platens 70 and/or the one or more second heated metal platens 30 can be heated by electric conductive heating, hot oil heating, hot water heating, and/or gas heating. As previously indicated, the processes of the present invention can be, and often are, carried out without the use of a curing oven. In other words, in these embodiments, the entire process is carried out such that the polyurethane foam-forming composition never passes through an atmosphere in which the air is heated to a temperature higher than 80° F. (27° C.) or, in some cases, higher than 75° F. (24° C.).

As previously indicated, in certain embodiments, the one or more first heated metal platens and/or the one or more second heated metal platens are stationary. In these embodiments, means are provided for pulling the first facing material and the second facing material past the one or more first heated metal platens and the one or more second heated metal platens, each of which are stationary. In other embodiments of the present invention, such as the embodiment depicted in FIG. 1, the one or more first heated metal platens and the one or more second heated metal platens are moving.

The processes of the present invention can comprise further variations, including removing one or both facing materials from the laminate 110, recycling or continuously reusing one or both of the facing materials, cutting the continuous laminate 110 to form individual sheets, or even using the finished foam laminate 110 as a facing sheet and producing a two layer foam sheet. For example, in some embodiments of the process of the present invention, the flexible polyurethane foam laminate 110 which comprises the first facing material and the second facing material is spliced (either in line after an accumulator as described above or as part of a subsequent process) to form two laminates, each of which comprises a facing material on only one side of the flexible foam. In some embodiments, such as where the laminate, such as the spliced laminate, is to be employed as a carpet underlayment, the facing material is selected so as to be impermeable to liquids, such as water, in order to provide a carpet underlayment design that has a liquid impermeable layer on one side of the flexible foam. In either case (whether the laminate contains a facing material on both sides of the flexible foam or where the laminate comprises a facing material on only one side of the flexible foam), such a laminate is suitable for use as a carpet underlayment.

The processes of the present invention are an improved method of producing a flexible foam laminate that can be used in many applications, such as a carpet underlayment or as a cushioning layer in various transportation vehicles, as well as ergonomic cushioning and devices, such as an attached carpet cushioning and carpet tiles with attached cushions.

As will be appreciated from the foregoing description, embodiments of the present invention are directed to a continuous compression molding process for producing a flexible polyurethane foam laminate, comprising: (a) feeding a first facing material along a first heated surface; (b) feeding a second facing material along a second heated surface, wherein the second heated surface is disposed generally parallel to the first heated surface at a preselected distance that defines a vertical space between the first facing material and the second facing material and that defines the thickness of the laminate; (c) depositing a polyurethane foam-forming composition onto the first facing material as it is being fed; and (d) allowing the polyurethane foam-forming composition to react in the vertical space, thereby rising until the rise is restricted by the second facing material and wherein the polyurethane foam-forming composition produces a cured flexible polyurethane foam laminate having a foam density of no more than 10 lb/ft$^3$ (160 kg/m$^3$).

Some embodiments of the present invention are directed to a process of the previous paragraph, wherein the first heated surface comprises one or more first heated metal platens and the second heated surface comprises one or more second heated metal platens, such as where the one or more first heated metal platens comprises a plurality of heated metal platens and the one or more second heated metal platens comprises a plurality of heated metal platens, and such as where the one or one or more first heated metal platens and the one or more second heated metal platens move along a conveyer path.

In certain embodiments, the present invention is directed to a process of either of the previous two paragraphs, wherein the first facing material and/or the second facing material comprises a polymeric film or an aluminum film.

In some embodiments, the present invention is directed to a process of any of the previous three paragraphs, wherein the thickness of the laminate is ¼ to 1 inch, ¼ to ¾ inch, or, in some cases, ½ inch.

Some embodiments of the present invention are directed to a process of any of the previous four paragraphs, wherein the flexible foam has a ratio of tensile strength to compressive strength (25% deflection) of at least 15:1, such as 15 to 70:1, or, in some cases 15 to 60:1, a % elongation of at least 100%, such as at least 130%, at least 150%, or, in some cases at least 200%, and/or a CFD 65% compression force deflection ranging from 1.5 to 10 psi, such as 1.5 to 8 psi, or, in some cases, 1.5 to 6 psi.

In some embodiments, the present invention is directed to a process of any of the previous five paragraphs, wherein the polyurethane foam-forming composition comprises a mixture of an isocyanate-reactive composition and a polyisocyanate, wherein the isocyanate-reactive composition comprises: (i) a polyether polyol having a nominal functionality of at least 3, such as 3 to 8, 3 to 6, 3 to 3, or 3, and an average OH number of 20 to 100, such as 25 to 80 to 30 to 75, such as a poly(oxypropylene/oxyethylene) polyether polyol comprising no more than 30% by weight, such as no more than 25% by weight, of copolymerized oxyethylene, based on 100% by weight of oxyalkylene; (ii) a polyether diol having a number average molecular weight of at least 1000 grams/mole, such as 1500 to 2500 gram/mole, and (iii) a chain extender having a hydroxyl functional of 2 and a molecular weight of no more than 300 grams/mole. In some of these embodiments, (i) is present in the isocyanate-reactive composition in an amount of at least 50% by weight, such as at least 60% by weight, or, in some cases, at least 70% by weight and/or up to 90% by weight, based on the total weight of isocyanate-reactive components in the isocyanate-reactive composition, (ii) is present in the isocyanate-reactive composition in an amount of at least 5% by weight, such as at least 10% by weight and/or up to 20% by weight, based on the total weight of isocyanate-reactive components in the isocyanate-reactive composition; and/or (iii) is present in the isocyanate-reactive composition in an amount of at least 1% by weight, such as at least 2% by weight and/or up to 10% by weight, such as up to 6% by weight, based on the total weight of isocyanate-reactive components in the isocyanate-reactive composition. Moreover, in some of these embodiments, the isocyanate-reactive composition further comprises a blowing agent, such as water, a catalyst, such as a non-emissive amine catalyst and an organic tin catalyst, and a surfactant.

Some embodiments of the present invention are directed to a process of any of the previous six paragraphs, wherein the polyisocyanate comprises a methylene-bridged polyphenyl polyisocyanate having an average functionality of from 2.4 to 2.6 isocyanate moieties per molecule and an NCO content of from 30 to 34 weight percent.

In certain embodiments, the present invention is directed to a process of any of the previous seven paragraphs, wherein the polyurethane foam-forming composition is conveyed between first heated surface, such as the first plurality of heated metal platens, and the second heated surface, such as the second plurality of heated platens, at a speed of at least 50 feet/minute (15 meters/minute), such as at least 80 feet/minute (24 meters/minute), such as 50 to 200 feet/minute (15 to 61 meters/minute), or, in some cases 80 to 120 feet/minute (24 to 37 meters/minute).

Other embodiments of the present invention are directed to a process of any of the previous eight paragraphs, wherein the cured flexible polyurethane foam laminate has a foam density of no more than 8 lb/ft$^3$ (128 kg/m$^3$), no more than 6 lb/ft$^3$ (96 kg/m$^3$), no more than 5 lb/ft$^3$ (80 kg/m$^3$), or, in some cases, 2 to 4 lb/ft$^3$ (32 to 64 kg/m$^3$).

Embodiments of the present invention are directed to a process of any of the previous nine paragraphs, wherein the foam-forming composition is essentially cured to produce a cured flexible polyurethane foam laminate before the composition passes the first heated surface and the second heated surface such that no oven is necessary for further curing.

Some embodiments of the present invention are directed to a process of any of the previous ten paragraphs, wherein the process does not include the use of a curing oven.

In some embodiments, the present invention is directed to a process of any of the previous eleven paragraphs, wherein the first heated surface and the heated surface have a surface temperature of at least 100° F. (38° C.), such as at least 120° F. (49° C.), at least 140° F. (60° C.), in some cases, 100 to 200° F. (38 to 93° C.), 120 to 180° F. (49 to 82° C.), or 140 to 160° F. (60 to 71° C.).

Other embodiments of the present invention are directed to a process of any of the previous twelve paragraphs, further comprising splicing the flexible polyurethane foam laminate which comprises the first facing material and the second facing material to form two laminates, each of which comprises a facing material on only one side of the flexible foam.

Some embodiments of the present invention are directed to a laminate produced by the process of any of the previous thirteen paragraphs, such as where the laminate is embodied as a carpet underlayment or as a cushioning layer in various transportation vehicles, as well as ergonomic cushioning and devices, such as an attached carpet cushioning and carpet tiles with attached cushions.

The non-limiting and non-exhaustive examples that follow are intended to further describe various non-limiting and non-exhaustive embodiments without restricting the scope of the embodiments described in this specification.

EXAMPLES

Example 1

Preparation of Foam-Forming Compositions

Foam-forming compositions were prepared using the ingredients and amounts (in parts by weight) listed in Table 1 using a suitable container for weighing and mixing the polyol blend components. Beginning with an empty container, base polyols and chain extenders were added to the container and the container was then transported to the mixing station. The mixer was a pneumatic driven motor with a mix blade attached to the end of the shaft. The container was placed under the mixer and then lowered into the liquid. The mixer was turned on at low speed to begin the agitation process. During this process, the intermediates (catalysts, surfactants) and water were added to the container. After the mixing process was complete, the container was sealed and transported to the laminator machine location. Using a dip tube and a diaphragm pump, the blended material was charged into a drained run tank. This process was conducted several times to ensure proper flushing and the remainder of the material was then charged into the run tank. The flushing and charging procedure was repeated with the polyisocyanate. The tanks were pressurized with a nitrogen pad. At this point the material was conditioned and monitored until the correct processing parameters were obtained (temperatures, pressures and specific gravities). During non-production mode the unit continuously recirculated the isocyanate and polyol blend at low pressures to maintain a stable thermal condition.

TABLE 1

| Component | Chemical Name | Example A | Example B | Example C | Example D |
|---|---|---|---|---|---|
| 1 | POLYOL 1[1] | 85 | 85 | 85 | 85 |
| 2 | POLYOL 2[2] | 15.56 | 15.56 | 15.56 | 15.56 |
| 3 | Diethylene Glycol | 5 | 5 | 5 | 5 |
| 4 | Water | 2.17 | 2.79 | 2.79 | 3.48 |
| 5 | Niax ™ Silicone L-5309[3] | 1 | 1 | 1 | 1 |
| 6 | Dabco ® NE 500[4] | 0.59 | 0.59 | 0.59 | 0.65 |
| 7 | Dabco ® T-131[5] | 0.34 | 0.33 | 0.33 | 0.37 |
| 8 | Dabco ® NE 300[6] | 0.2 | 0.19 | 0.19 | 0.21 |
| 9 | ISOCYANATE[7] | 58.04 | 55.6 | 55.6 | 78.99 |
| | Index (100 Isocyanate/Polyol) | 110 | 90 | 90 | 110 |

[1] A 4,800-molecular weight polyoxypropylene triol specially modified with ethylene oxide; functionality 3; hydroxyl number 33.8-37.235 mg KOH/g; viscosity of about 820 cps @25° C., commercially available from Covestro LLC.
[2] A 2,000-molecular weight polypropylene glycol; functionality 2; hydroxyl number 54.7-57.5 mg KOH/g; viscosity of 335-370 cps @ 25° C., commercially available from Covestro LLC.
[3] Non-hydrolyzable silicone surfactant, commercially available from Momentive Performance Materials Inc.
[4] non-emissive amine catalyst commercially available from Air Products and Chemicals, Inc.
[5] organotin catalyst commercially available from Air Products and Chemicals, Inc.
[6] non-emissive amine catalyst commercially available from Air Products and Chemicals, Inc.
[7] polymeric diphenylmethane diisocyanate (pMDI); NCO weight ≥31.8%; viscosity 50-95 mPa · s @ 25° C.; equivalent weight 129; functionality 2.4, commercially available from Covestro LLC.

Example 2

Preparation of Flexible Polyurethane Foam Laminate

Laminated foam pads were produced on a pilot scale lamination machine at Covestro LLC's Pittsburgh, Pa., USA facility. The lamination machine was a Hennecke, Inc. machine, which utilized a high pressure, hydraulically-operated, two stream mix head capable of impingement mixing pressures typically in the 2000 psi range. The mix head material outlet port had been modified to accept a dual stream manifold apparatus that acted as a dispensing tool in order to facilitate a more homogeneous distribution of the reacting material. The conveyer was 26.5 feet in length and was capable of making foam out to forty-eight inches in finished width. The foam was laminated between a top and bottom facer. These facers were constructed of a two-ply aluminum foil/Kraft paper or a two-ply polyethylene/polypropylene facer. The foam was cured by heated platens moving simultaneously in conjunction with the facer material. The heating system for the platens incorporated an insulated tunnel which the platens traveled through to maintain a consistent temperature. The tunnel included separate ducts for supplying the top and bottom platens with forced hot air. The laminate foam product produced was skived into two separate cushion pads each having a facer on one side.

Prior to beginning the experiment, the platen temperature was correctly set and the top and bottom facers properly positioned. The isocyanate and the polyol were injected into the mix head at the correct ratio according to the impingement mixing principle. The mix head ensured optimal mixing of the two liquids. The mix head dispense port opened into pour mode and the foaming process began. The polyurethane was dispensed onto the moving bottom facer. The parallel moving top facer was then laid down immediately upon the polyurethane liquid resulting in laminate flexible foam upon curing.

Process conditions used for production of experimental samples are set forth in Table 2. Properties of the resulting foam laminates are set forth in Table 3. Preparation of the laminated foam samples used for Ball Rebound (resilience) testing is set forth in Table 4.

TABLE 2

| | |
|---|---|
| Total Feed Rate | 20.4 lbs./min. |
| Resin Temperature | 86° F. |
| Isocyanate Temperature | 86° F. |
| Platen Temperature | 150° F. |
| Line Speed | 23 ft/min |

TABLE 3

| Test Details | Units | Example A | Example B | Example C | Example D |
|---|---|---|---|---|---|
| Ball Rebound (resilience) ASTM 3574 test H-facer side down | % | 37 | 42.6 | 43 | 49.4 |
| Ball Rebound (resilience) ASTM 3574 test H-facer side up | % | 50 | 49.6 | 56 | 56.6 |
| CFD 65% ASTM D3574C Compression deflection | psi | 5.323 | 4.05 | 2.655 | 9.458 |
| CFD 65% ASTM D3574C Compression deflection rest | psi | 3.075 | 1.785 | 1.71 | 3.758 |
| CFD 65% ASTM D3574C Thickness | in | 1.013 | 1.043 | 1.48 | 0.965 |
| Foam Laminate Density ASTM D3574A/D5308 test | pcf | 3.87 | 3.58 | 3.26 | 3.03 |

TABLE 4

| Example | Facer Type | Foam Sample Preparation | Facer Position During Test |
|---|---|---|---|
| Example A | aluminum foil | facer was skived off - test conducted on exposed foam | facer side down |
| Example A | aluminum foil | facer was left intact-test conducted on facer side | facer side up |
| Example B | aluminum foil | facer was skived off - test conducted on exposed foam | facer side down |
| Example B | aluminum foil | facer was left intact-test conducted on facer side | facer side up |
| Example C | aluminum foil (bottom) & PP/PE (top) | facer was skived off - test conducted on exposed foam | facer side down |
| Example C | aluminum foil (bottom) & PP/PE (top) | PP/PE facer was left intact-test conducted on facer side | facer side up |
| Example D | PP/PE | facer was skived off - test conducted on exposed foam | facer side down |
| Example D | PP/PE | facer was left intact-test conducted on facer side | facer side up |

Example A shows that a foam pad with desirable properties was produced using a formulation having a relatively low amount of water, i.e. 2.17%, and an Index of 90. Example B shows that a lower density softer pad was achieved (3.58 lb/ft$^3$) by increasing the amount of water. Since the chemical composition of Example B and Example C was the same, Example C shows that just making the pad thicker reduced the pad density from 3.58 to 3.26 lb/ft$^3$. Finally, Example D shows that further increases in water (3.48%) pushed the pad density even lower to 3.03 lb/ft$^3$. Example D shows that the final firmness can be adjusted downward by reducing the index from 110 as was used in Example D. By increasing the water levels further, even lower pad densities are believed to be achievable.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A continuous compression molding process for producing a laminate comprising a flexible polyurethane foam, a first flexible film facing material and a second flexible film facing material, the method comprising:
   (a) feeding the first flexible film facing material along a first heated surface;

(b) feeding the second flexible film facing material along a second heated surface, wherein the second heated surface is disposed generally parallel to the first heated surface at a preselected distance that defines a vertical space between the first flexible film facing material and the second flexible film facing material and that defines the thickness of the laminate;

(c) depositing a polyurethane foam-forming composition onto the first flexible film facing material as it is being fed; and (d) allowing the polyurethane foam-forming composition to react in the vertical space to form the flexible polyurethane foam, thereby rising until the rise is restricted by the second flexible film facing material, wherein the laminate has a foam density of no more than 10 lb/ft$^3$ (160kg/m$^3$), wherein the first heated surface comprises one or more first heated metal platens and the second heated surface comprises one or more second heated metal platens, and wherein the polyurethane foam-forming composition comprises a mixture of an isocyanate-reactive composition and a polyisocyanate, wherein the isocyanate-reactive composition comprises:

(i) at least 70% by weight and up to 90% by weight, based on the total weight of isocyanate-reactive components in the isocyanate-reactive composition, of a polyether polyol having a nominal functionality of at least 3 and an average OH number of 20 to 100;

(ii) a polyether diol having a number average molecular weight of at least 1000 grams/mole, and (iii) a chain extender having a hydroxyl functional of 2 and a molecular weight of no more than 300 grams/mole.

2. The process of claim 1, wherein the one or mare first heated metal platens comprises a plurality of heated metal platens and the one or more second heated metal platens comprises a plurality of heated metal platens, wherein the first heated metal platens and the second heated metal platens move along a conveyer path.

3. The process of claim 1, wherein the thickness of the laminate is ¼ to 1 inch.

4. The process of claim 1, wherein (i) is a triol having an average OH number of 30 to 75.

5. The process of claim 4, wherein (i) is a polyether polyol that is a reaction product of an initiator and a mixture of propylene oxide and ethylene oxide, wherein the polyether polyol comprises no more than 30% by weight of copolymerized oxyethylene, based on 100% by weight of oxyalkylene.

6. The process of claim 1, wherein (ii) has a number average molecular weight of 1500 to 2500 grams/mole.

7. The process of claim 1, wherein (ii) is present in the isocyanate-reactive composition in an amount of at least 5% by weight and up to 20% by weight, based on the total weight of isocyanate-reactive components in the isocyanate-reactive composition.

8. The process of claim 7, wherein (iii) is present in the isocyanate-reactive composition in an amount of at least 1% by weight and up to 10% by weight, based on the total weight of isocyanate-reactive components in the isocyanate-reactive composition.

9. The process of claim 1, wherein the isocyanate-reactive composition further comprises a blowing agent comprising water, a catalyst, and a surfactant.

10. The process of claim 9, wherein the catalyst comprises a non-emissive amine catalyst and an organic tin catalyst.

11. The process of claim 1, wherein the laminate has a foam density of 2 to 4 lb/ft$^3$ (32 to 64 kg/m$^3$).

12. The process of claim 1, wherein the process does not include the use of a curing oven.

13. The process of claim 1, wherein the first heated surface and the second heated surface have a surface temperature of at least 120° F. (49°C.).

14. The process of claim 1, further comprising splicing the laminate to form two laminates, each of which comprises a facing material on only one side of the flexible foam.

15. The process of claim 1, comprising a dwell time of 30 seconds to 2 minutes.

16. A continuous compression molding process for producing a laminate comprising a flexible polyurethane foam, a first flexible film facing material and a second flexible film facing material, the method comprising:

(a) feeding the first flexible film facing material along a first heated surface;

(b) feeding the second flexible film facing material along a second heated surface, wherein the second heated surface is disposed generally parallel to the first heated surface at a preselected distance that defines a vertical space between the first flexible film facing material and the second flexible film facing material and that defines the thickness of the laminate;

(c) depositing a polyurethane foam-forming composition onto the first flexible film facing material as it is being fed; and (d) allowing the polyurethane foam-forming a composition to react in the vertical space to form the flexible polyurethane foam, thereby rising until the rise is restricted by the second flexible film facing material, wherein the laminate has a foam density of no more than 10 lb/ft$^3$ (160 kg/m$^3$), and wherein the polyurethane foam-forming composition comprises a mixture of an isocyanate-reactive composition and a polyisocyanate, wherein the isocyanate-reactive composition comprises:

(i) at least 70% by weight and up to 90% by weight, based on the total weight of isocyanate-reactive components in the isocyanate-reactive composition, of a polyether polyol having a nominal functionality of at least 3 and an average OH number of 20 to 100;

(ii) a polyether diol having a number average molecular weight of at least 1000 grams/mole, and (iii) a chain extender having a hydroxyl functional of 2 and a molecular weight of no more than 300 grams/mole.

17. The process of claim 16, wherein:

the polyether diol is present in the isocyanate-reactive composition in an amount of at least 5% by weight and up to 20% by weight, based on the total weight of isocyanate-reactive components in the isocyanate-reactive composition; and the chain extender is present in the isocyanate-reactive composition in an amount of at least 1% by weight and up to 10% by weight, based on the total weight of isocyanate-reactive components in the isocyanate-reactive composition.

18. The process of claim 16, wherein the first heated surface comprises one or more first heated metal platens and the second heated surface comprises one or more second heated metal platens.

19. The process of claim 18, wherein the one or more first heated metal platens comprises a plurality of heated metal platens and the one or more second heated metal platens comprises a plurality of heated metal platens, wherein the first heated metal platens and the second heated metal platens move along a conveyer path.

20. The process of claim 16, wherein the process does not include the use of a curing oven.

21. The process of claim 16, wherein the first heated surface and the second heated surface have a surface temperature of at least 120° F. (49'C.).

22. The process of claim 16, comprising a dwell time of 30 second to 2 minutes.

\* \* \* \* \*